(12) United States Patent
Nair (10) Patent No.: US 9,396,061 B1
(45) Date of Patent: Jul. 19, 2016

(54) AUTOMATED REPAIR OF STORAGE SYSTEM COMPONENTS VIA DATA ANALYTICS

(71) Applicant: EMC Corporation, Hopkinton, MA (US)

(72) Inventor: Sudhakaran Nair, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 181 days.

(21) Appl. No.: 14/143,988

(22) Filed: Dec. 30, 2013

(51) Int. Cl.
*G06F 11/00* (2006.01)
*G06F 11/07* (2006.01)
*G06F 11/34* (2006.01)

(52) U.S. Cl.
CPC .......... *G06F 11/0793* (2013.01); *G06F 11/079* (2013.01); *G06F 11/34* (2013.01); *G06F 11/3452* (2013.01)

(58) Field of Classification Search
CPC ..... G06F 11/07; G06F 11/0793; G06F 11/34; G06F 11/3452
See application file for complete search history.

(56) References Cited

U.S. PATENT DOCUMENTS

| | | | | |
|---|---|---|---|---|
| 4,849,879 A | * | 7/1989 | Chinnaswamy | G06F 11/34 706/45 |
| 5,062,055 A | * | 10/1991 | Chinnaswamy | G06F 11/34 702/182 |
| 7,437,615 B2 | | 10/2008 | Iwamitsu et al. | |
| 8,244,671 B2 | | 8/2012 | Chen et al. | |
| 8,547,107 B2 | | 10/2013 | Abe et al. | |
| 2008/0168302 A1 | | 7/2008 | Cagno et al. | |
| 2011/0087924 A1 | * | 4/2011 | Kandula | G06F 11/0709 714/26 |
| 2011/0239051 A1 | * | 9/2011 | Basu | G06F 11/079 714/37 |
| 2013/0031424 A1 | * | 1/2013 | Srivastava | G06F 11/008 714/47.2 |
| 2013/0283090 A1 | * | 10/2013 | Bradley | G06F 11/0793 714/2 |
| 2013/0311968 A1 | * | 11/2013 | Sharma | G06Q 10/06 717/101 |
| 2014/0172371 A1 | * | 6/2014 | Zhu | G06F 11/0709 702/185 |
| 2015/0067147 A1 | * | 3/2015 | Carmel | H04L 43/0817 709/224 |

* cited by examiner

*Primary Examiner* — Joshua P Lottich (74) *Attorney, Agent, or Firm* — BainwoodHuang (57) ABSTRACT

An improved technique involves automatically applying a mapping from anomalous values of a parameter that describes the performance of a component to a defect in the component. As part of operations of a data storage system, a computer collects data related to performance metrics of components of the data storage system. Upon receiving the data, the computer determines sequences of values of the performance metrics that indicate anomalous behavior of the component. The computer than maps these values to a defect of the component, and performs a corrective operation on the component to correct the defect.

14 Claims, 4 Drawing Sheets

Collect, by a computer, component metric data from the component of the data storage system, the component metric data including a set of values of parameters that describe a performance of the component within the data storage system

102

Identify, by the computer, a subset of the set of values that is indicative of an abnormal performance of the component metric data

104

Apply, by the computer, a mapping from the subset of the set of values to a defect in the component

106

Perform, by the computer, a corrective operation on the defect in the component of the data storage system, the corrective operation being configured to correct the defect

108

AUTOMATED REPAIR OF STORAGE SYSTEM COMPONENTS VIA DATA ANALYTICS

BACKGROUND

Data storage systems contain components such as disks for storing any amount of data and storage processors for processing commands related to reading or writing data stored in the disk arrays. As with any system of even moderate complexity, there is a risk that a component within the data storage system may behave erratically or fail. For example, a disk in an array may exhibit increased access times or a storage processor may suddenly go offline. A system administrator of a data storage system may contact a technical support department upon the discovery of an issue with a system component.

A technical support department of a system vendor implements technical support procedures to repair components of the systems they support. Conventional repair procedures involve manually collecting information about the component. For example, technical support personnel may remotely access configuration information about the component. The technical support personnel may then compare this information with that found in best practices documentation to produce a diagnosis, and, based on the diagnosis, attempt to repair the component.

SUMMARY

Unfortunately, there are deficiencies with the above-described conventional repair procedures. For example, manually collecting information is a very slow and unreliable way to repair a component of a data storage system.

In contrast with the above-described conventional repair procedures that are slow and unreliable, an improved technique involves automatically applying a mapping from anomalous values of a parameter that describes the performance of a component to a defect in the component. As part of operations of a data storage system, a computer collects data related to performance metrics of components of the data storage system. Upon receiving the data, the computer determines sequences of values of the performance metrics that indicate anomalous behavior of the component. The computer than maps these values to a defect of the component, and performs a corrective operation on the component to correct the defect.

Advantageously, the improved technique provides a much faster and more reliable path to repairing a problem with a component of a data storage system. For example, tools such as data analytics provide the capability to link events at a component of a data storage system to performance data for that component. Such tools enable a computer to automate the repair process by correlating events such as data access requests and performance metrics. The computer also benefits from data analytic techniques in automatically identifying defects from anomalous performance data.

One embodiment of the improved technique is directed to a method of taking corrective action in connection with a component of a data storage system. The method includes collecting, by a computer, component metric data from the component of the data storage system, the component metric data including a set of values of parameters that describe a performance of the component within the data storage system. The method also includes identifying, by the computer, a subset of the set of values that is indicative of an abnormal performance of the component metric data. The method further includes applying, by the computer, a mapping from the subset of the set of values to a defect in the component. The method further includes performing, by the computer, a corrective operation on the defect in the component of the data storage system, the corrective operation being configured to correct the defect.

Additionally, some embodiments of the improved technique are directed to an apparatus constructed and arranged to take corrective action in connection with a component of a data storage system. The apparatus includes memory and a set of processors coupled to the memory to form controlling circuitry. The controlling circuitry is constructed and arranged to carry out a method of taking corrective action in connection with a component of a data storage system.

Furthermore, some embodiments of the improved technique are directed to a computer program product having a non-transitory computer-readable storage medium which stores code including a set of instructions which, when executed by a data storage system, cause the data storage system to take corrective action in connection with a component of a data storage system.

In some arrangements, the method further includes performing a verification operation, a result of the verification operation being a verification of whether the corrective operation corrects the defect, inputting the result of the verification operation into a machine learning model configured to adjust the mapping based on the result of the verification operation, and adjusting the mapping according to the machine learning model.

In some arrangements, the mapping includes a set of weights, each of the set of weights i) corresponding to a value of a parameter of the set of parameters that describe the performance of the component within the data storage system and ii) defining a significance of the parameter to an overall performance of the component. Adjusting the mapping according to the machine learning model includes setting the value of each of the set of weights based on the result of the verification operation.

In some arrangements, collecting the component metric data includes obtaining the set of values of the parameters at instants of time over a specified period of time, the set of values including each value of the parameters and a corresponding timestamp indicating an instant of time at which that value of the parameters was obtained, and storing the set of values in memory as the values of the parameters are obtained. Applying the mapping includes extracting the subset of the set of values of the parameters from memory after the set of values are obtained over the specified period of time, and inputting the subset of the set of values into the mapping.

In some arrangements, storing the set of values in memory as the values of the parameters are obtained includes performing a filtering operation on the values of the parameters, the filtering operation causing the values of the set of parameters to have a minimum signal to noise ratio over the previous period of time.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves automatically applying a mapping from anomalous values of a parameter that describes the performance of a component to a defect in the component. As part of the operation of a data storage system, a computer collects data related to performance metrics of components of the data storage system. Upon receiving the data, the computer determines sequences of values of the performance metrics that indicate anomalous behavior of the component. The computer than maps these values to a defect of the component, and performs a corrective operation on the component to correct the defect.

Figure 1:
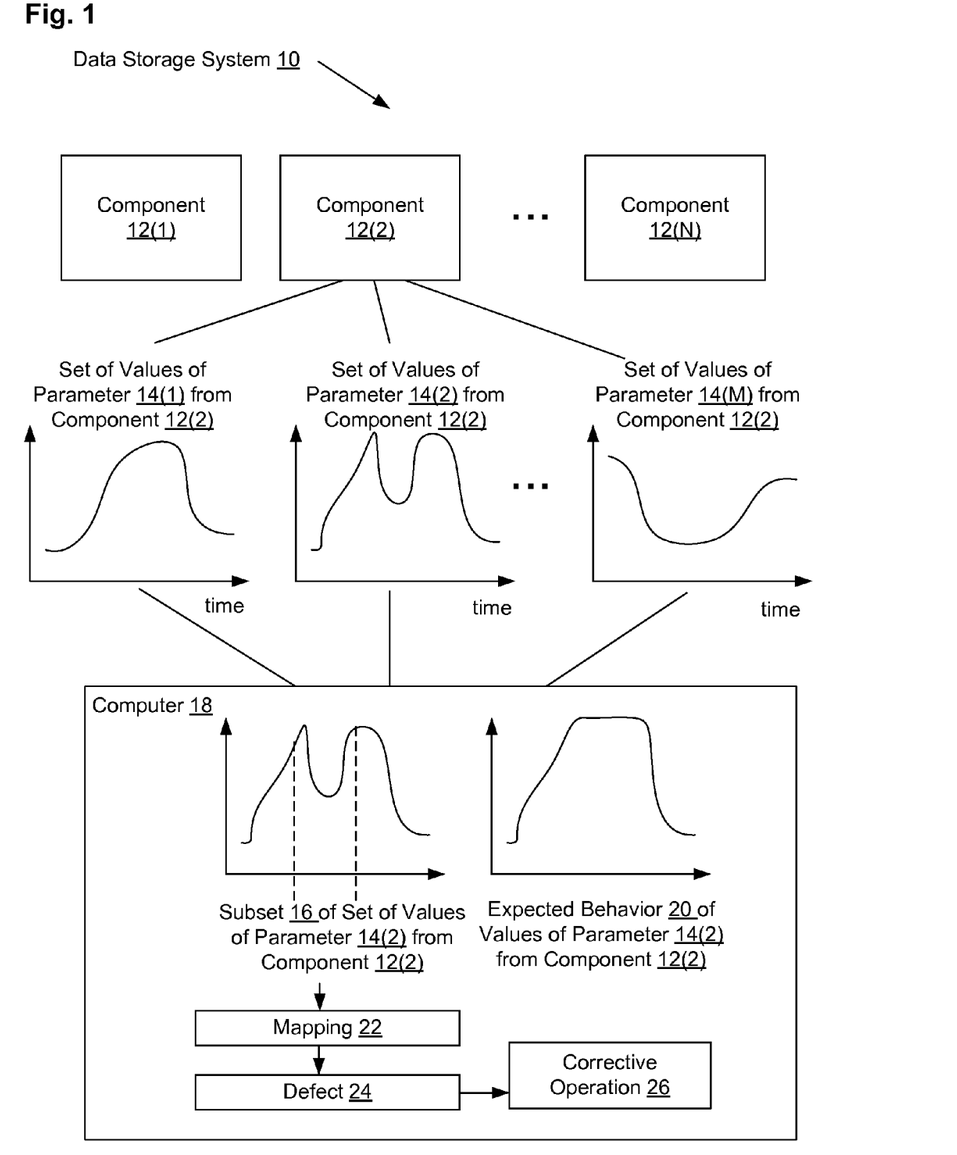
FIG. 1 is a block diagram illustrating an example data storage system in which the improved technique may be carried out.

FIG. 1 illustrates an example data storage system 10 in which the improved techniques are carried out. Data storage system 10 includes computer 18 and components 12(1), 12(2), . . . , 12(N), which may have a problem to be fixed.

Components 12(1), 12(2), . . . , 12(N) (generally, components 12) include, for example, disks, disk arrays, and storage processors that store and control the flow of data in and out of data storage system 10. Each component 12 operates with varying degrees of performance. Consequently, each such component 12 is configured to measure and record certain performance metrics in order that its performance may be monitored. Taking component 12(2) as an example, such performance metrics take the form of parameter values 14(1), 14(2), . . . , 14(M). For example, an individual disk may have as performance metrics percent utilization and data access time, while a storage processor may have as performance metrics a number of transactions processed per second and CPU utilization.

Computer 18 takes the form of a server, although in some arrangements, computer 18 may be a desktop computer, laptop computer, or a cluster of such. Computer 18 is constructed and arranged to take corrective action in connection with a component 12 of data storage system 10.

It should be understood that computer 18 is connected to components 12 of data storage system 10 via, e.g., cables, wireless, switches/routers, gateways/bridges, NAS/SAN appliances/nodes, interfaces, etc. Computer 18 may be located in the same location as data storage system 10 (as shown in FIG. 1) or at a location remote from data storage system 10. In the latter configuration, computer 18 would further include a network interface for interfacing with a communications medium that provides network connections between data storage system 10 and computer 18.

During operation, components 12 of data storage system 10 produce, in the course of standard operation, values of parameters 14 representing performance metrics over a period of time. For example, when component 12(2) is a disk of a disk array, component 12(2) records values of a data access time (parameter 14(1)), percent utilization (parameter 14(2)), and spin speed (parameter 14(M)). It should be understood that each component 12 samples these values over some period of time, or on a continuous basis. In some arrangements, components 12 sample parameter values 14 at regular time intervals in order to build up a time series; in other arrangements, however, the sampling may be irregular.

It should be understood that, while FIG. 1 shows the sampling of the parameter values 14 over time in a continuous graph, the actual sampling is discrete; the graphs provided in FIG. 1 are for illustrative purposes. It should also be understood that each such graph represents a profile of parameter values 14 over a period of time. In some arrangements, such a profile may be indicative of whether a component 12 is exhibiting anomalous behavior or normal behavior.

As the parameter values 14(1), 14(2), . . . , 14(M) are generated by component 12(2), component 12(2) sends parameter values 14(1), 14(2), . . . , 14(M) to computer 18. Alternatively, computer 18 acquires parameter values 14(1), 14(2), . . . , 14(M) from computer 18.

Upon receipt of parameter values 14(1), 14(2), . . . , 14(M), computer 18 locates corresponding expected values 20. For example, consider the set of parameter values 14(2), which corresponds to a percent utilization over time. Computer 18 locates expected values 20 of this parameter, e.g., in storage according to some matching criteria. Further details about locating expected values 20 will be discussed below in connection with FIG. 4.

It should be understood that expected values 20 originate from results of, e.g., data analytics taken from past behavior of component 12(2). In some arrangements, expected values 20 originate from analytics results taken from similar components in other data storage systems.

Computer 18 then compares expected values 20 with received parameter values 14(2). In doing so, computer 18 determines the length of time over which expected values 20 are sampled, and measures parameter values 14(2) over substantially the same time window. In some arrangements, computer 18 determined the time window over which parameter values 14(2) are compared by correlating the beginning of the window with an event from an event log.

Once computer 18 has determined the window over which received parameter values 14(2) are to be compared with expected values 20, computer 18 takes a difference between parameter values 14(2) and expected values 20. In some arrangements, the sampling frequency of the data in parameter values 14(2) and expected values 20 is the same so that over the same time period, the number of points in the data in each data sample is the same, so that computer 18 may take a straight difference between corresponding data points. In other arrangements, however, the number of data points in the samples 14(2) and 20 are different; in this case, computer 18 may perform a filtering or interpolation step on parameter values 14(2) before it takes a difference. Further details on filtering operations are discussed below in connection with FIG. 3.

Computer 18 then locates a subset of values 16 that exhibit a substantial difference from expected values 20. In the absence of noise, such a subset 16 will exhibit a pattern indicative of an abnormal operation of component 12(2). For example, when parameter values 14(2) represent disk utilization, subset of values 16 represents a decrease in utilization relative to expected values 20 of that utilization. This could be the result of, e.g., data being unavailable for over a period of time due to some temporary disk failure.

Computer 18 determines the defect 24 from this subset of values 16 by performing a mapping 22 between subset 16 of values and defect 24. Such a mapping 22, in some arrangements, may take the form of a library of defects. In other arrangements, however, mapping 22 takes the form of a numerical formula involving weights for each parameter 14 and subset of values 16. Further details on mapping 22 will be discussed below in connection with FIG. 3.

Once computer 18 determines the defect 24 that has caused the anomalous behavior of the parameter values 14(2), computer 18 performs a corrective step 26 to repair defect 24 in component 12(2). Such a corrective step 26 may take the form of a notification or alert to an administrator, pointing out defect 24. In some arrangements, however, corrective step 26 may be an actual repair.

Further details of computer 18 are described below in connection with FIG. 2.

Figure 2:
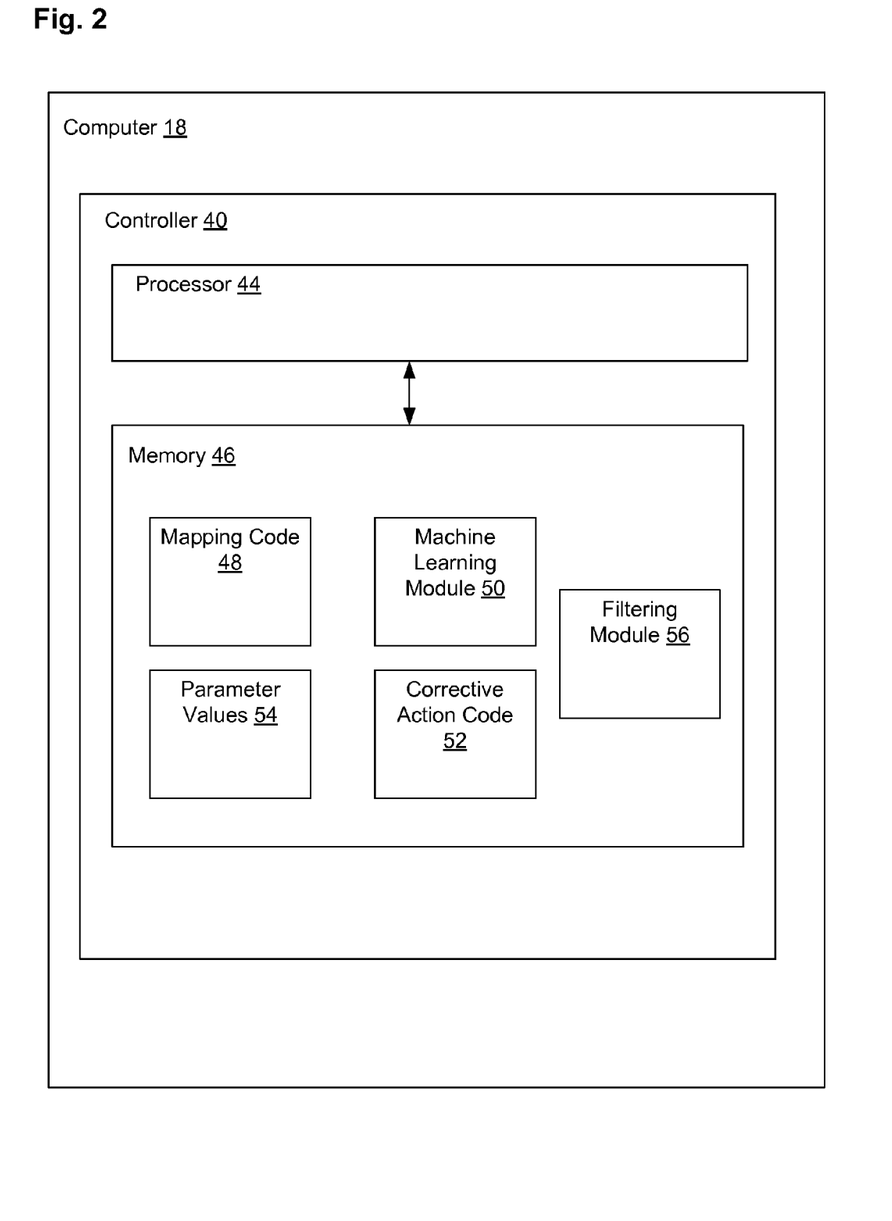
FIG. 2 is block diagram illustrating an example computer within the data storage system shown in FIG. 1.

FIG. 2 illustrates an example computer 18. Computer 18 includes controller 40, which in turn includes processor 44 and memory 46, as well as machine learning module 58 and filtering module 60.

Memory 46 generally takes the form of, e.g., random access memory, although in some arrangements memory 46 includes flash memory or a non-volatile memory. Memory 46 stores various segments of code that contain instructions to take corrective action in connection with a component 12 of data storage system 10. For example, memory 46 includes mapping code 48 that contains instructions for mapping subsets 16 of parameter values to defects 24. Memory 46 also includes corrective action code 52 that contains instructions for taking corrective action 26 to defects 24. Memory 46 further contains space 54 for storing parameter values, such as expected values 20 and received values 14.

In some arrangements, memory 46 also includes machine learning code 50 and filtering code 56. Machine learning module 58 contains instructions to perform machine learning operations in response to corrective actions 26. Filtering module 60 contains instructions to perform filtering operations on received parameter values 14. Further details about the machine learning operations and filtering operations are discussed below in connection with FIG. 3.

Processor 44 takes the form of, but is not limited to, Intel or AMD-based CPUs, and can include a single or multiple cores each running single or multiple threads. Processor 44 is coupled to memory 46 and is configured to execute instructions from mapping code 48 and corrective action code 52.

Figure 3:
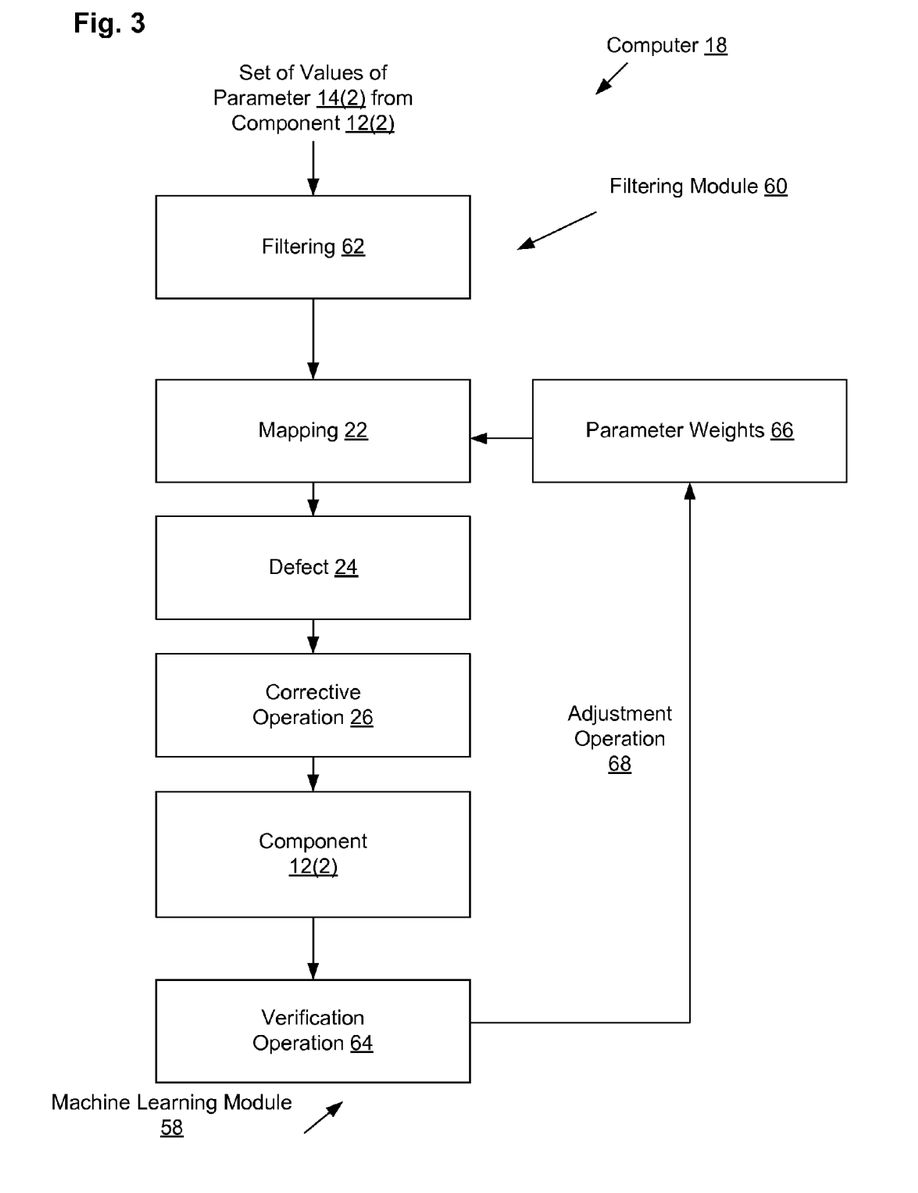
FIG. 3 is a block diagram illustrating an example machine learning process within the data storage system shown in FIG. 1.

FIG. 3 illustrates an example process for improving the success of automated repairs according to the improved technique with computer 18. The example process includes a filtering operation 62, a verification operation 64, and an adjustment operation 68.

Upon receiving set of values of parameter 14(2) from component 12(2), for example, filtering module 60 performs a filtering operation 62. Filtering operation 62 is configured to increase a signal to noise ratio of values 14(2) using various techniques such as moving averages, deconvolutions, interpolations, and the like. For example, computer 18 may perform a linear interpolation on received data 14(2) when the number of sample points in data 14(2) does not match the number of sample points in expected values 20 over a specified period of time.

By removing noise according to known behaviors of component 12(2), differences between received values 14(2) and expected values 20 better represent anomalies in behavior of component 12(2). Filtering operation 62 removes non-deterministic time dependence from received values 14(2) due to inherent random noise in component 12(2). When expected values 20 have been subject to a similar filtering operation 62, then received values 14(2) and expected values 20 should be substantially similar when component 12(2) exhibits no anomalous behavior.

Processor 44 then maps filtered values 14 (for all parameters) to a defect 24 via a mapping operation 22. In some arrangements, mapping operation 22 involves weighting differences 16 for each component according to precomputed weights 66 which indicate an importance of each parameter to the cause of an anomalous behavior of component 12(2).

After the above-described mapping 22 and corrective operations 26 on received values 14, computer 18 performs a verification operation 64 in order to verify whether corrective operation 26 actually corrected defect 24 of component 12(2). Verification operation 64 involves an independent assessment of component 12(2) as to whether component 12(2) suffered from defect 24 predicted by the improved techniques, and whether corrective operation 26 repaired defect 24. For example, verification operation may involve running management software such as Unisphere™ from EMC® Corp. of Hopkinton, Mass. through which an administrator may report defects.

Based on the result of verification operation 64, machine learning module 58 performs an adjustment operation 68 on weights 66 in order to better reflect the mapping of parameter values 14 to defects 24. Adjustment operation 68 involves a machine learning algorithm such as a neural network or genetic algorithm. The machine learning algorithm may be supervised or unsupervised.

Figure 4:
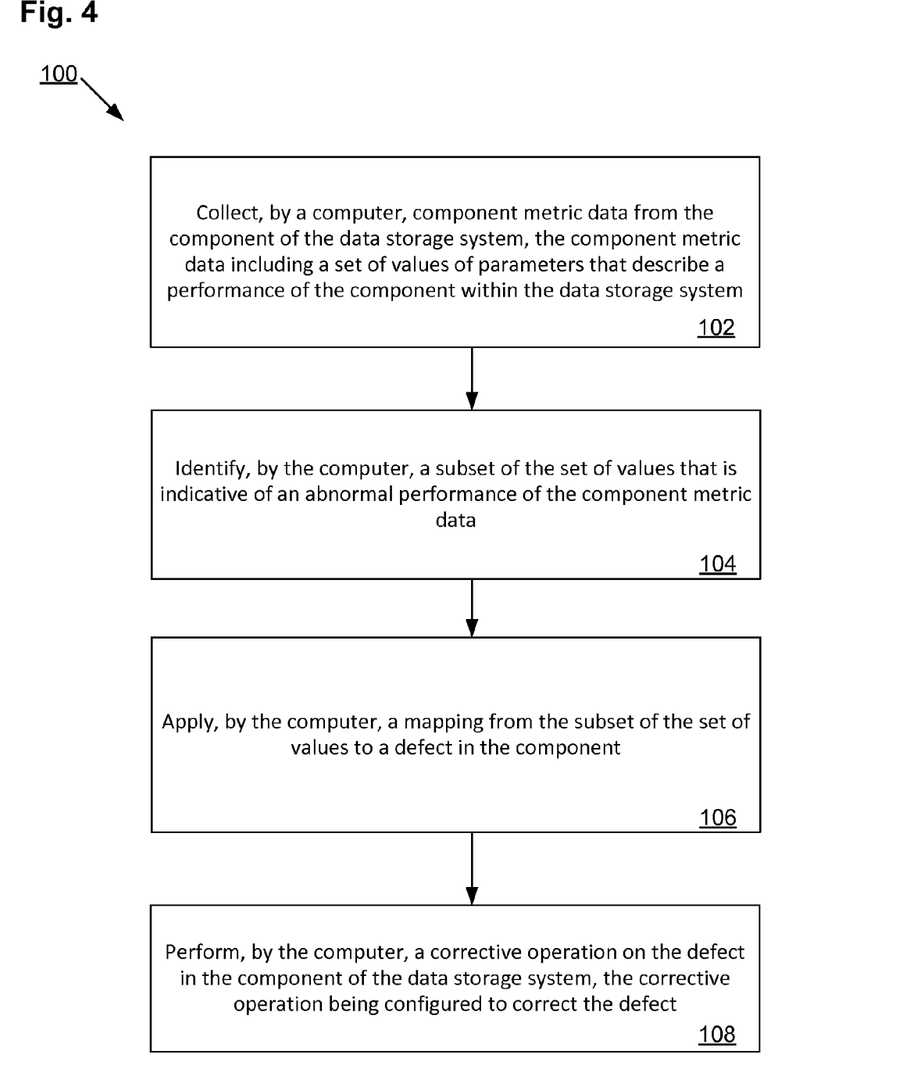
FIG. 4 is a flow chart illustrating an example method of carrying out the improved technique within the data storage system shown in FIG. 1.

FIG. 4 illustrates a method 100 of taking corrective action in connection with a component, e.g., component 12(2), of data storage system 10, including steps 102, 104, 106, and 108.

In step 102, a computer, e.g., computer 18, collects component metric data from the component, the component metric data including a set of values of parameters, e.g., values 14, that describe a performance of the component within the data storage system. The values include performance metrics and instants of time at which the performance metrics were recorded.

In step 104, the computer identifies a subset, e.g., subset 16, of the set of values that is indicative of an abnormal performance of the component metric data.

In step 106, the computer applies a mapping, e.g., mapping 22, from the subset of the set of values to a defect, e.g., mapping 24, in the component.

In step 108, the computer performs a corrective operation, e.g., corrective operation 26, on the defect in the component of the data storage system, the corrective operation being configured to correct the defect As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion has dealt mainly with computers that automatically perform corrective operations on components of a data storage system from performance data from the components. In some arrangements, however, the computer may simply provide a diagnosis of a problem with the components.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of taking corrective action in connection with a component of a data storage system, the method comprising:
    collecting, by a computer, component metric data from the component of the data storage system, the component metric data including a set of values of parameters that describe a performance of the component within the data storage system;
    identifying, by the computer, a subset of the set of values that is indicative of an abnormal performance of the component metric data;
    applying, by the computer, a mapping from the subset of the set of values to a defect in the component; and
    performing, by the computer, a corrective operation on the defect in the component of the data storage system, the corrective operation being configured to correct the defect;
    wherein collecting the component metric data includes performing a filtering operation on the values of the parameters, the filtering operation causing the values of the set of parameters to have a minimum signal to noise ratio over a period of time previous to a period of time over which the set of values of the parameters is obtained.

2. A method of taking corrective action in connection with a component of a data storage system, the method comprising:
    collecting, by a computer, component metric data from the component of the data storage system, the component metric data including a set of values of parameters that describe a performance of the component within the data storage system;
    identifying, by the computer, a subset of the set of values that is indicative of an abnormal performance of the component metric data;
    applying, by the computer, a mapping from the subset of the set of values to a defect in the component;
    performing, by the computer, a corrective operation on the defect in the component of the data storage system, the corrective operation being configured to correct the defect;
    performing a verification operation, a result of the verification operation being a verification of whether the corrective operation corrects the defect;
    inputting the result of the verification operation into a machine learning model configured to adjust the mapping based on the result of the verification operation; and
    adjusting the mapping according to the machine learning model.

3. A method as in claim 2,
    wherein the mapping includes a set of weights, each of the set of weights i) corresponding to a value of a parameter of the set of parameters that describe the performance of the component within the data storage system and ii) defining a significance of the parameter to an overall performance of the component;
    wherein adjusting the mapping according to the machine learning model includes:
        setting the value of each of the set of weights based on the result of the verification operation.

4. A method as in claim 2,
    wherein collecting the component metric data includes:
        obtaining the set of values of the parameters at instants of time over a specified period of time, the set of values including each value of the parameters and a corresponding timestamp indicating an instant of time at which that value of the parameters was obtained, and
        storing the set of values in memory as the values of the parameters are obtained; and
    wherein applying the mapping includes:
        extracting the subset of the set of values of the parameters from memory after the set of values are obtained over the specified period of time, and
        inputting the subset of the set of values into the mapping.

5. A method as in claim 4,
    wherein storing the set of values in memory as the values of the parameters are obtained includes:
        performing a filtering operation on the values of the parameters, the filtering operation causing the values of the set of parameters to have a minimum signal to noise ratio over the previous period of time.

6. A method as in claim 1, wherein identifying the subset of the set of values that is indicative of an abnormal performance of the component metric data includes identifying, as the subset of the set of the values, a sequence of the values that indicate an anomalous performance of the component.

7. An electronic apparatus constructed and arranged to take corrective action in connection with a component of a data storage system, including a controller including controlling circuitry coupled to the memory, the controlling circuitry being constructed and arranged to:
    collect, by a computer, component metric data from the component of the data storage system, the component metric data including a set of values of parameters that describe a performance of the component within the data storage system;
    identify, by the computer, a subset of the set of values that is indicative of an abnormal performance of the component metric data;
    apply, by the computer, a mapping from the subset of the set of values to a defect in the component;
    perform, by the computer, a corrective operation on the defect in the component of the data storage system, the corrective operation being configured to correct the defect;
    perform a verification operation, a result of the verification operation being a verification of whether the corrective operation corrects the defect;
    input the result of the verification operation into a machine learning model configured to adjust the mapping based on the result of the verification operation; and
    adjust the mapping according to the machine learning model.

8. An apparatus as in claim 7,
    wherein the mapping includes a set of weights, each of the set of weights i) corresponding to a value of a parameter of the set of parameters that describe the performance of the component within the data storage system and ii) defining a significance of the parameter to an overall performance of the component;

wherein the controlling circuitry constructed and arranged to adjust the mapping according to the machine learning model is further constructed and arranged to:
set the value of each of the set of weights based on the result of the verification operation.

9. An electronic apparatus constructed and arranged to take corrective action in connection with a component of a data storage system, including a controller including controlling circuitry coupled to the memory, the controlling circuitry being constructed and arranged to:
collect, by a computer, component metric data from the component of the data storage system, the component metric data including a set of values of parameters that describe a performance of the component within the data storage system;
identify, by the computer, a subset of the set of values that is indicative of an abnormal performance of the component metric data;
apply, by the computer, a mapping from the subset of the set of values to a defect in the component; and
perform, by the computer, a corrective operation on the defect in the component of the data storage system, the corrective operation being configured to correct the defect;
wherein the controlling circuitry constructed and arranged to collect the component metric data is further constructed and arranged to:
obtain the set of values of the parameters at instants of time over a specified period of time, the set of values including each value of the parameters and a corresponding timestamp indicating an instant of time at which that value of the parameters was obtained, and
store the set of values in memory as the values of the parameters are obtained; and
wherein the controlling circuitry constructed and arranged to apply the mapping is further constructed and arranged to:
extract the subset of the set of values of the parameters from memory after the set of values are obtained over the specified period of time, and
input the subset of the set of values into the mapping.

10. An apparatus as in claim 9,
wherein the controlling circuitry constructed and arranged to store the set of values in memory as the values of the parameters are obtained is further constructed and arranged to:
perform a filtering operation on the values of the parameters, the filtering operation causing the values of the set of parameters to have a minimum signal to noise ratio over the previous period of time.

11. A computer program product comprising a non-transitory, computer-readable storage medium which stores instructions that, when executed by a controller, cause the controller to take corrective action in connection with a component of a data storage system by:
collecting, by a computer, component metric data from the component of the data storage system, the component metric data including a set of values of parameters that describe a performance of the component within the data storage system;
identifying, by the computer, a subset of the set of values that is indicative of an abnormal performance of the component metric data;
applying, by the computer, a mapping from the subset of the set of values to a defect in the component;
performing, by the computer, a corrective operation on the defect in the component of the data storage system, the corrective operation being configured to correct the defect;
performing a verification operation, a result of the verification operation being a verification of whether the corrective operation corrects the defect;
inputting the result of the verification operation into a machine learning model configured to adjust the mapping based on the result of the verification operation; and
adjusting the mapping according to the machine learning model.

12. A computer program product as in claim 11,
wherein the mapping includes a set of weights, each of the set of weights i) corresponding to a value of a parameter of the set of parameters that describe the performance of the component within the data storage system and ii) defining a significance of the parameter to an overall performance of the component;
wherein adjusting the mapping according to the machine learning model includes:
setting the value of each of the set of weights based on the result of the verification operation.

13. A computer program product comprising a non-transitory, computer-readable storage medium which stores instructions that, when executed by a controller, cause the controller to take corrective action in connection with a component of a data storage system by:
collecting, by a computer, component metric data from the component of the data storage system, the component metric data including a set of values of parameters that describe a performance of the component within the data storage system;
identifying, by the computer, a subset of the set of values that is indicative of an abnormal performance of the component metric data;
applying, by the computer, a mapping from the subset of the set of values to a defect in the component; and
performing, by the computer, a corrective operation on the defect in the component of the data storage system, the corrective operation being configured to correct the defect;
wherein collecting the component metric data includes:
obtaining the set of values of the parameters at instants of time over a specified period of time, the set of values including each value of the parameters and a corresponding timestamp indicating an instant of time at which that value of the parameters was obtained, and
storing the set of values in memory as the values of the parameters are obtained; and
wherein applying the mapping includes:
extracting the subset of the set of values of the parameters from memory after the set of values are obtained over the specified period of time, and
inputting the subset of the set of values into the mapping.

14. A method of taking corrective action in connection with a component of a data storage system, the method comprising:
collecting, by a computer, component metric data from the component of the data storage system, the component metric data including a set of values of parameters that describe a performance of the component within the data storage system;
identifying, by the computer, a subset of the set of values that is indicative of an abnormal performance of the component metric data;

applying, by the computer, a mapping from the subset of the set of values to a defect in the component; and performing, by the computer, a corrective operation on the defect in the component of the data storage system, the corrective operation being configured to correct the defect;

wherein collecting the component metric data includes:
  obtaining the set of values of the parameters at instants of time over a specified period of time, the set of values including each value of the parameters and a corresponding timestamp indicating an instant of time at which that value of the parameters was obtained, and
  storing the set of values in memory as the values of the parameters are obtained; and wherein applying the mapping includes:
  extracting the subset of the set of values of the parameters from memory after the set of values are obtained over the specified period of time, and
  inputting the subset of the set of values into the mapping.

* * * * *